United States Patent [19]

Kim

[11] Patent Number: 5,782,262
[45] Date of Patent: Jul. 21, 1998

[54] GAS VENTILATION APPARATUS FOR A FUEL TANK

[75] Inventor: Jae-San Kim, Kyungki-Do, Rep. of Korea

[73] Assignee: Hyundai Motor Company, Seoul, Rep. of Korea

[21] Appl. No.: 762,972

[22] Filed: Dec. 10, 1996

[30] Foreign Application Priority Data

Dec. 11, 1995 [KR] Rep. of Korea ............. 95-48420

[51] Int. Cl.⁶ ........................................ F16K 24/04
[52] U.S. Cl. ..................... 137/202; 137/43; 137/587
[58] Field of Search ..................... 137/43, 202, 587, 137/588

[56] References Cited

U.S. PATENT DOCUMENTS

| | | | |
|---|---|---|---|
| 3,548,847 | 12/1970 | Roven | 137/202 X |
| 3,910,302 | 10/1975 | Sudhir | 137/43 |
| 4,958,655 | 9/1990 | Danek | 137/587 X |
| 4,989,629 | 2/1991 | Shirakawa | 137/202 |
| 5,031,790 | 7/1991 | Keller | 220/203 |
| 5,277,217 | 1/1994 | Kobayashi et al. | 137/202 X |
| 5,282,497 | 2/1994 | Allison | 137/588 X |
| 5,313,978 | 5/1994 | Takaki et al. | 137/43 |
| 5,409,030 | 4/1995 | Sung | 137/39 |
| 5,497,800 | 3/1996 | Ohashi et al. | 137/587 X |

*Primary Examiner*—Gerald A. Michalsky
*Attorney, Agent, or Firm*—Christie, Parker & Hale, LLP

[57] ABSTRACT

An improved gas ventilation apparatus for a fuel tank by which it is possible to more effectively ventilate a volatile gas from the interior of the fuel tank and preventing a leakage of the fuel through a discharge pipe even when the discharge pipe is damaged, which includes a housing arranged in an inner portion of an upper panel of a fuel tank, a gas discharge unit arranged in the interior of the housing, the upper portion of which is engaged to the upper portion of the fuel tank, and being operable in accordance with the pressure of the fuel gas generated in the fuel tank through an inlet hole formed in the lower portion of a discharge body, and a discharge pipe communicating with one side of the housing and passing through a lateral surface of the fuel tank through the interior of the fuel tank in order for the fuel gas to be discharged through the gas discharge unit.

2 Claims, 3 Drawing Sheets

5,782,262

GAS VENTILATION APPARATUS FOR A FUEL TANK

BACKGROUND OF THE INVENTION

1. Field of the Invention

The present invention relates to a gas ventilation apparatus for a fuel tank, and in particular to an improved gas ventilation apparatus for a fuel tank which is capable of more effectively ventilating a volatile gas from the interior of the fuel tank and preventing a leakage of a fuel through a discharge pipe even when the discharge pipe is damaged.

2. Description of the Conventional Art

FIG. 1 is a cross-sectional view illustrating the construction of a conventional fuel overflowing prevention apparatus, and FIG. 2 is a horizontal cross-sectional view taken along line II-II' of FIG. 1.

As shown therein, a discharge outlet 4 connected with a connector 6 extended to a connection hose for connecting with a canister (not shown) is extended to an upper plate of a fuel tank 2. A casing 8 is integrally formed in the interior of the fuel tank 2. A means for ventilating a fuel gas from the fuel tank 2 and preventing the overflow of the fuel is arranged therein.

The above-described means includes a float 10 which is liftably arranged in the casing 8, and a first elastic member 12 for causing the float 10 to be more easily lifted. The upper portion of the first elastic member 12 is arranged in a seat groove 14, and the lower portion thereof is inserted into a protrusion 18 of a seat plate 16 in order for the float to be stably positioned.

The casing 8 includes a plurality of holes 20 in order for the fuel gas in the fuel tank 2 to flow to the canister (not shown) through the discharge outlet 4. In addition, the float 10, as shown in FIG. 2, includes a plurality of sharp edge portions 22 extended from a circular portion 21 having a smaller diameter than the inner diameter of the casing 8. These sharp edge portions 22 contact with the inner circumferential surface of the casing 8.

A path 25 is formed between a straight line portion 23 connecting the sharp edge portions 22 and the inner circumferential surface of the casing 8, through which path 25 fuel gas in the fuel tank 2 flows.

The float 10 includes a head 24 arranged around the discharge outlet 4 for blocking the overflow of the fuel. The top portion of the head 24 is formed to have a smaller diameter for easier insertion into the discharge outlet 4.

In addition, the float 10 includes an orifice 26 passing through the head 24. The orifice 26 is opened/closed by a check valve 28 which controls the pressure in the fuel tank 2 for discharging the fuel gas.

The check valve 28 includes a space 27 communicating with the orifice 26 in the float 10. In the space 27, a valve spool 30 is elastically supported by a second elastic member 32, and the orifice 26 becomes communicated with the fuel tank 2 as the valve spool 30 compresses the second elastic member 32 when the pressure in the fuel tank 2 is increased. The hole which is formed at the lowest portion among the holes 20 formed in the casing 8 is positioned at a portion departed from the surface of the fuel so that the fuel is filled in the fuel tank 2.

The operation of the conventional fuel overflowing prevention apparatus for a fuel tank will now be explained with reference to FIGS. 1 and 2.

The fuel gas in the fuel tank 2 is introduced into the interior of the casing 8 through the hole 20 and is transferred to the canister (not shown) through the path 25 and the discharge outlet 4 in a normal condition. If the fuel is introduced into the interior of the casing 8 when the vehicle is severely moved or tilted, the float 10 is lifted by buoyancy force of the fuel, and the head 24 blocks the discharge outlet 4, for thus preventing the overflow of the fuel. In addition, if the vehicle runs at high speed for a long time, or if the vehicle is parked for a long time at a place where the temperature is high, the fuel is vaporized in the fuel tank 2, so the pressure in the fuel tank 2 is increased. At this time, when the pressure in the fuel tank 2 is higher than the elastic force of the second elastic member 32, the valve spool 30 is lifted, and the orifice 26 becomes communicated with the fuel tank 2, and then the fuel gas is discharged through the discharge outlet 4.

However, the conventional fuel overflowing preventing apparatus has the following disadvantages.

First, when the vehicle runs on an uneven road, which causes severe vibration of the vehicle, and when the vehicle runs on the road inclined at a predetermined angle, the fuel is discharged into the casing 8. Thereafter, the float 10 is lifted by buoyancy force of the fuel and the elastic force of the first elastic member 12, and the head 24 closes the discharge outlet. In the above-described state, when the vehicle runs for a long time at a high speed, or the vehicle is parked for a long time at a place where the temperature is high, the fuel is vaporized in the fuel tank 2. Since there is not a proper means for ventilating the thusly vaporized fuel gas, the fuel tank 2 may explode due to the increased pressure.

In addition, since the casing 8 is integrally formed with the fuel tank 2, if the check valve 28 is not operational, or the float 10 is escaped from its original position, it is impossible to maintain the components therein.

SUMMARY OF THE INVENTION

Accordingly, it is an object of the present invention to provide an improved gas ventilation apparatus for a fuel tank which overcomes the problems encountered in the conventional art.

It is another object of the present invention to provide an improved gas ventilation apparatus for a fuel tank which is capable of closing a path between the interior of a fuel tank and a discharge pipe in a normal condition, and effectively discharging the fuel gas when the pressure of the fuel gas vaporized in the fuel tank exceeds a predetermined level.

It is another object of the present invention to provide an improved gas ventilation apparatus for a fuel tank by which it is possible to more effectively ventilate a volatile gas from the interior of the fuel tank and preventing a leakage of fuel through a discharge pipe even when the discharge pipe is damaged.

To achieve the above objects, there is provided an improved gas ventilation apparatus for a fuel tank, which includes a housing arranged in an inner portion of an upper panel of a fuel tank; a gas discharge unit arranged in the interior of the housing, the upper portion of which is engaged to the upper portion of the fuel tank and operated in accordance with the pressure of the fuel gas which is generated in the fuel tank and flows through an inlet hole formed in the lower portion of a discharge body; and a discharge pipe which communicates with the housing on one side, passes through the interior of the fuel tank, and penetrates a lateral surface of the fuel tank on the other side in order for the fuel gas to be discharged out of the fuel tank.

The gas discharge unit includes a discharge body having a plurality of discharge holes formed on the upper circumferential surface thereof in order for the fuel gas introduced into the interior of the discharge body to be discharged to a discharge path formed between the housing and the discharge body, and an opening/closing cap elastically supported by an elastic member in the interior of the discharge body in order for the inlet hole to be opened/closed in accordance with the pressure of the fuel gas in the fuel tank.

An opening/closing head is arranged in the upper portion of the opening/closing cap so as to open/close an orifice formed in a wall arranged in the interior of the discharge body so as to prevent the fuel introduced through the inlet hole from being overflown.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The present invention will become more fully understood from the detailed description given hereinbelow and the accompanying drawings which are given by way of illustration only, and thus are not limitative of the present invention, wherein.

DETAILED DESCRIPTION OF THE INVENTION

Figure 1:
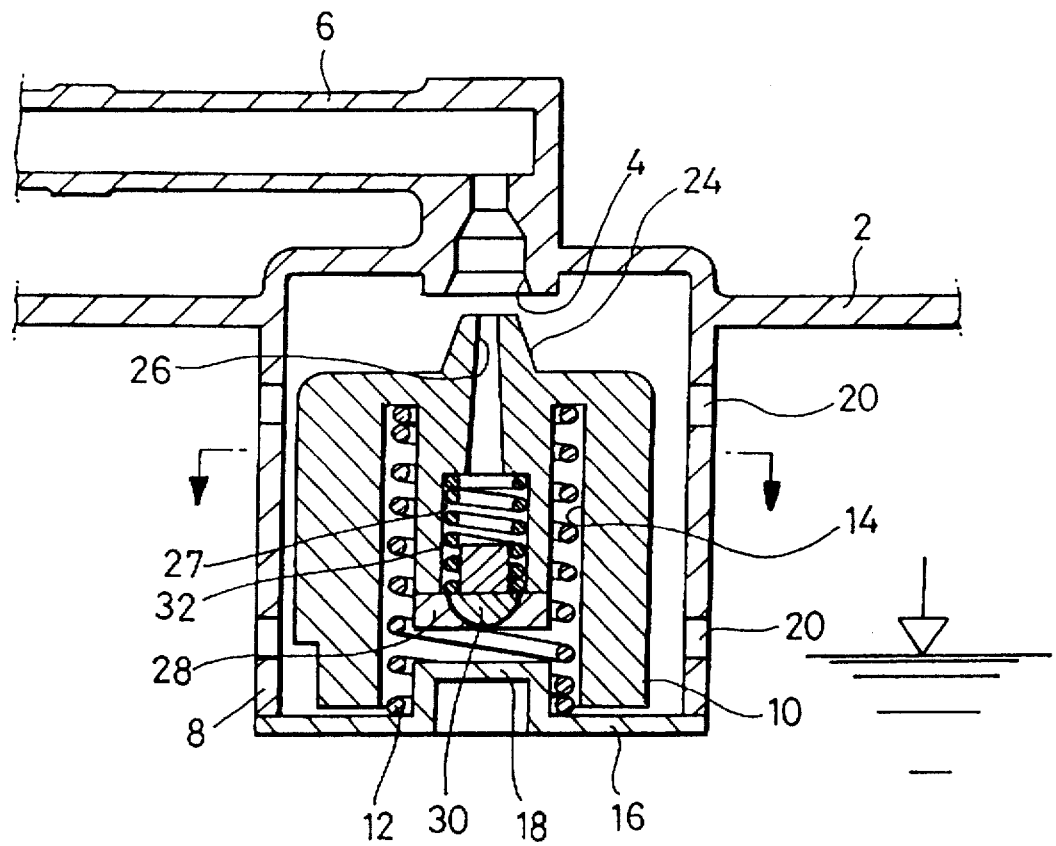
FIG. 1 is a cross-sectional view illustrating the construction of a conventional fuel overflowing prevention apparatus.
Figure 2:
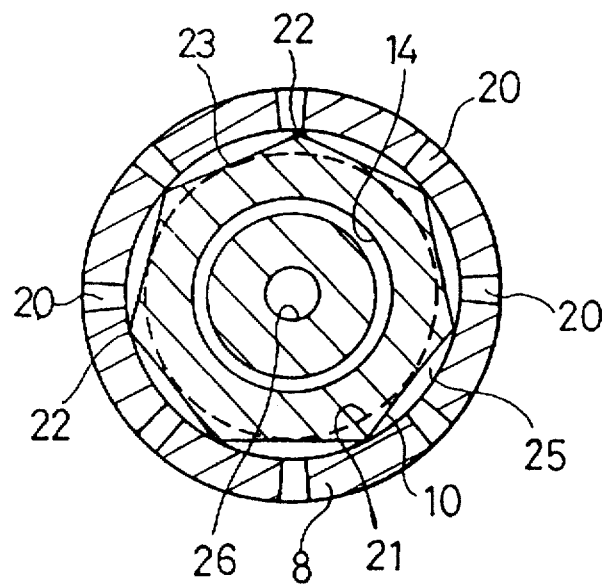
FIG. 2 is a horizontal cross-sectional view taken along line II-II' of FIG. 1.
Figure 3:
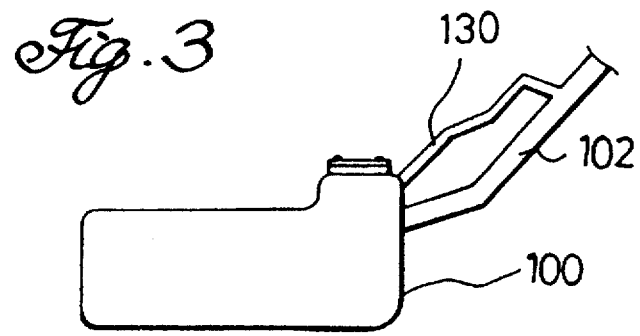
FIG. 3 is a front view illustrating a fuel tank having a gas ventilation apparatus for a fuel tank according to the present invention.
Figure 4:
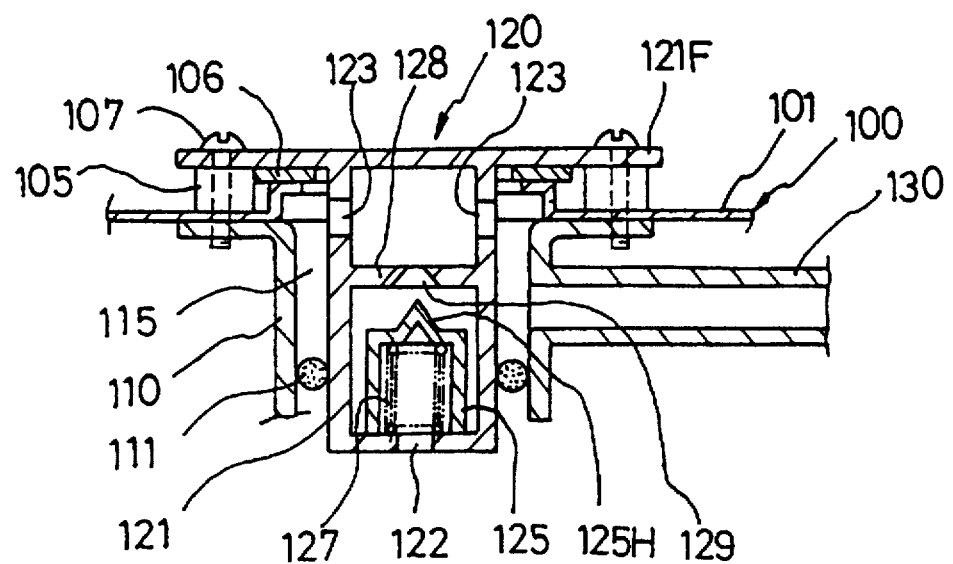
FIG. 4 is a cross-sectional view illustrating the construction of a gas ventilation apparatus for a fuel tank according to the present invention.

FIG. 3 is a front view illustrating a fuel tank having a gas ventilation apparatus for a fuel tank according to the present invention, and FIG. 4 is a cross-sectional view illustrating the construction of a gas ventilation apparatus for a fuel tank according to the present invention.

As shown therein, a housing 110 is arranged at an inner portion of an upper panel 101 of a fuel tank 100. A discharge body 121 of a gas discharge unit 120 is disposed in the housing 110, with a lower portion of the discharge body 121 exposed to the interior of the fuel tank 100. The discharge body 121 is engaged with the upper panel 101 of the fuel tank 100 by an upper flange 121F. Here, a spacer rubber 105 is arranged between the upper flange 121F and the upper panel 101, and a packing 106 is arranged between the discharge body 121 and the upper panel 101 so that the discharge body 121 and the upper panel 101 can be sealingly engaged to each other.

An inlet hole 122 is formed in the lower portion of the discharge body 121, through which inlet hole 122 the fuel gas is introduced from the fuel tank 100. An opening/closing cap 125 is arranged in the interior of the discharge body 121 for opening/closing the inlet hole 122. Here, the opening/closing cap 125 is elastically supported by the coil spring 127 in the interior of the discharge body 121 in order for the inlet hole 122 to be closed in a normal condition. An opening/closing head 125H is arranged on the top portion of the opening/closing cap 125 so as to prevent the fuel from being discharged to the outside of the fuel tank 100 by closing an orifice 129 when the opening/closing cap 125 is lifted by buoyancy force of the fuel introduced into the discharge body 121.

In addition, a wall 128 having the orifice 129 is arranged over the upper portion of the opening/closing cap 125. This wall 128 serves to prevent the fuel from being discharged to the outside when the fuel is introduced into the interior of the discharge body 121.

A plurality of discharge holes 123 are formed in the upper circumferential surface of the discharge body 121 in order for the fuel gas introduced through the inlet hole 122 and passed through the orifice 129 to be discharged to the outside of the discharge body 121.

In addition, a path 115 is formed between the discharge body 121 and the housing 110 in order for the fuel gas discharged from the discharge holes 123 to be transferred to a discharge pipe 130. Here, a seal 111 is arranged between the discharge body 121 and the housing 110 for sealingly blocking a communication between the path 115 and the fuel tank 100.

The discharge pipe 130 is arranged in one side of the housing 110 in order for the fuel gas transferred to the path 115 to be discharged to the outside of the fuel tank 100. The discharge pipe 130 is extended to the outside of the fuel tank 100 through the inner upper space of the fuel tank 100 and the side surface of the fuel tank 100.

Figure 5:
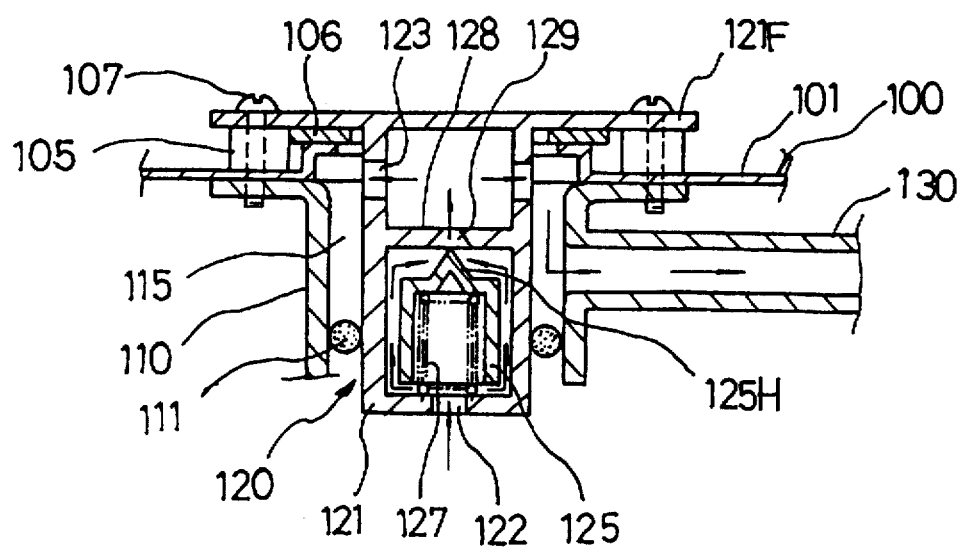
FIG. 5 is a cross-sectional view illustrating the construction of a gas ventilation apparatus for a fuel tank according to the present invention so as to explain the operational state thereof.

The operation of the gas ventilation apparatus for a fuel tank according to the present invention will now be explained with reference to FIGS. 3 through 5.

The discharging operation of the vaporized fuel gas in the fuel tank 100 will now be explained with reference to FIG. 5.

When the pressure of the fuel gas in the fuel tank 100 exceeds the elastic force of the coil spring 127, the coil spring 127 is extended, and then the opening/closing cap 125 upwardly moves, and the inlet hole 122 is opened.

Thereafter, the fuel gas from the interior of the fuel tank 100 is discharged into the interior of the discharge body 121 through the inlet hole 122, and then is transferred to the upper portion of the discharge body 121 through the orifice 129 formed in the wall 128. The fuel gas transferred to the upper portion of the discharge body 121 is transferred to the path 115 formed between the discharge body 121 and the housing 110 through the discharge holes 123 formed in the upper circumferential surface of the discharge body 121.

Also, the fuel gas transferred to the path 115 is discharged to the outside of the fuel tank 100 through the discharge pipe 130.

Meanwhile, when the fuel gas in the fuel tank 100 is discharged by a predetermined amount, the pressure in the fuel tank 100 is decreased, and the opening/closing 125 closes the inlet hole 122 in cooperation with the elastic force of the coil spring 127. When the pressure of the fuel gas in the fuel tank 100 becomes a predetermined level again, enough to cause the opening/closing cap 125 to be opened, the fuel gas is automatically discharged again to the outside of the fuel tank 100. Therefore, it is possible to maintain a predetermined pressure in the fuel tank 100.

If the fuel is introduced into the interior of the fuel tank 100 through the inlet hole 122, the opening/closing cap 125 is lifted by buoyancy force of the fuel therein. Therefore, the opening/closing head 125H closes the orifice 129, for thus preventing the fuel from being discharged to the outside of the fuel tank 100 through the orifice 129.

As described above, according to the gas ventilation apparatus for a fuel tank according to the present invention, the fuel tank and the discharge pipe are not always communicated with each other. Namely, the fuel tank and the discharge pipe are communicated or closed in accordance with the pressure level of the fuel gas in the fuel tank, for thus effectively discharging the fuel gas. In particular, since there is formed the inlet hole in the lower portion of the discharge body to which hole the pressure of the fuel gas is applied, it is possible to more efficiently discharge the fuel gas.

In addition, the housing and the gas discharge unit are assembled to the upper panel of the fuel tank, it is easier to maintain the system when the gas discharge unit is not operational.

Furthermore, since the fuel tank and the discharge pipe are closed in a normal condition, the liquid fuel is not leaked from the fuel tank. Particularly, even when the discharge pipe is damaged due to an accident, the fuel in the fuel tank is not leaked from the discharge pipe.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A gas ventilation apparatus for a fuel tank, comprising:

a housing having an interior and adapted to be arranged in an inner portion of an upper panel of such fuel tank;

a gas discharge unit arranged in the interior of the housing, comprising:
an upper portion and a bottom portion, wherein the upper portion is adapted to be mounted on an upper portion of such fuel tank, and an inlet hole formed in the bottom portion of the gas discharge unit;
a discharge body comprising:
an upper portion having a circumferential surface;
an interior; and
a plurality of discharge holes formed on the circumferential surface of the of the upper portion of the discharge body in order for fuel gas introduced into the interior of the discharge body to be discharged to a path formed between the housing and the discharge body; and
an opening and closing cap, positioned over the inlet hole, having an upper portion and elastically supported by an elastic member in the interior of the discharge body in order for the inlet hole to be opened and closed in accordance with the pressure of fuel gas which is generated in such fuel tank and introduced into the gas discharge unit through the inlet hole; and
a discharge pipe which communicates with the housing on one side of the discharge pipe, passes through an interior of such fuel tank, and penetrates a lateral surface of such fuel tank on the other side of the discharge pipe in order for the fuel gas to be discharged out of such fuel tank.

2. The apparatus of claim 1, wherein an opening/closing head is arranged in the upper portion of the opening/closing cap so as to open/close an orifice formed in a wall arranged above the opening/closing cap in the interior of the discharge body so as to prevent the fuel introduced through the inlet hole from being overflown.

* * * * *